United States Patent [19]

Brocklehurst

[11] Patent Number: 5,750,891
[45] Date of Patent: May 12, 1998

[54] METHOD AND APPARATUS FOR DETERMINING THE AIRSPEED OF ROTARY WING AIRCRAFT

[75] Inventor: Alan Brocklehurst, Bradford Abbas, United Kingdom

[73] Assignee: GKN Westland Helicopters Limited, Yeovil, United Kingdom

[21] Appl. No.: 711,927

[22] Filed: Sep. 11, 1996

[30] Foreign Application Priority Data

Sep. 14, 1995 [GB] United Kingdom ............... 9518800

[51] Int. Cl.$^6$ ............................................. G01C 21/00
[52] U.S. Cl. ................................................. 73/178 H
[58] Field of Search ............................. 73/170.02, 170.11,
73/178 H, 180, 181, 182, 183, 204.26,
204.27, 147; 244/17.13, 766, 76 C, 76 R,
90, 179, 184, 186, 194, 195, 75 R; 364/424.06,
922.8

[56] References Cited

U.S. PATENT DOCUMENTS

| | | | |
|---|---|---|---|
| 2,531,521 | 11/1950 | Link | 73/178 H |
| 2,952,154 | 9/1960 | Traksel | 73/178 H |
| 2,986,933 | 6/1961 | Summerlin et al. | 73/178 H |
| 3,070,999 | 1/1963 | Garbell | |
| 3,332,282 | 7/1967 | Daw | 73/182 |
| 4,648,271 | 3/1987 | Woolf | 73/204.27 |
| 4,747,305 | 5/1988 | Evans et al. | 73/182 |
| 4,856,329 | 8/1989 | Buck et al. | 73/204.26 |
| 5,050,086 | 9/1991 | Lambregts | 244/179 |
| 5,063,777 | 11/1991 | Arethens et al. | 73/178 H |

FOREIGN PATENT DOCUMENTS 325427  9/1920  Germany.

OTHER PUBLICATIONS

Patent Abstracts of Japan, JP4218778, Oct. 8, 1992, vol. 16, No. 568.

*Primary Examiner*—William L. Oen
*Attorney, Agent, or Firm*—Larson & Taylor

[57] ABSTRACT

A method and apparatus for determining the airspeed of a rotary wing aircraft having a sustaining rotor with a plurality of radially extending rotor blades for rotation about a substantially vertical axis comprises the steps of measuring an airflow sideslip angle established during rotation of each rotor blade by the vector of a radial flow component due to the relative wind vector and the rotational velocity perpendicular to a blade feathering axis, producing a signal representative of the sideslip angle, comparing the signal in a processor containing information on a known relationship between the sideslip angle and airspeed, providing an output signal representative of the airspeed and wind direction to a display which may display both the airspeed and wind direction.

19 Claims, 7 Drawing Sheets

METHOD AND APPARATUS FOR DETERMINING THE AIRSPEED OF ROTARY WING AIRCRAFT

BACKGROUND TO THE INVENTION

This invention relates to a method and apparatus for determining the airspeed of a rotary wing aircraft and the wind direction, and is particularly concerned with providing such information at low airspeed.

A means for accurately determining the airspeed of a helicopter and wind direction relative thereto in low speed flight is highly desirable especially during certain phases of operation such as during rejected take-offs and when operating from the decks of ships and oil rig platforms.

Such instrumentation with sufficient accuracy has thus far proved difficult to achieve.

1. Description of the Prior Art

Conventional fuselage mounted devices such as pitot and static pressure sensing devices are adversely affected especially at low airspeeds by the highly irregular flow close to the helicopter fuselage due to the interaction of many influences including the effects of main rotor wake.

An alternative prior approach has been to relate the rotor control positions to the airspeed and direction of the helicopter. This has proved difficult because the centre of gravity position must be known, the position of control means such as a swash plate must be very accurately monitored and allowances must be made for control inputs and accelerations so that the steady airspeed can be deduced.

2. Object of the Invention

A main objective of this invention is to provide a method and apparatus for determining the airspeed of a rotary wing aircraft which overcomes or reduces the aforementioned problems. A further objective is to achieve the main objective using measurements of the airflow on the main sustaining rotor blades which can be related directly to airspeed and relative wind direction.

SUMMARY OF THE INVENTION

Accordingly, in one aspect, this invention provides a method of detecting the airspeed of a rotary wing aircraft having a sustaining rotor with a plurality of radially extending rotor blades for rotation about a substantially vertical axis, comprising the steps of measuring on at least one of the rotor blades of the sustaining rotor, an airflow sideslip angle established by rotation of the rotor, producing a signal representative of said sideslip angle, comparing said signal in processing means containing information on a known relationship between said sideslip angles and airspeed, and providing an output signal representative of the airspeed and wind direction to a display means.

In another aspect the invention provides an airspeed indicating system for a rotary wing aircraft having a sustaining rotor comprising a plurality of radially extending rotor blades for rotation about a generally vertical axis comprising sensing means on at least one of the rotor blades for sensing an airflow sideslip angle established by interaction between a radial flow caused by a relative wind vector and a rotational velocity perpendicular to a blade feathering axis and generating a signal representative of the sideslip angle, transmission means for transmitting the signal to processing means on the aircraft fuselage, the processing means containing information on a known relationship between the measured sideslip angle and airspeed for providing an Output signal representative of the airspeed and relative wind direction to indicating means for displaying said airspeed and relative wind direction.

The airflow sideslip angle $\beta$ may be established by the equation:

$$\beta = \arctan\{V\cos(\Psi+\theta)/(xVT+V\sin(\Psi+\theta))\}$$

where:

V is the velocity of the relative wind, $\theta$ is the relative direction of the wind (the wind azimuth), VT is the tip speed of the rotor blades, x is the radial location of the sideslip detectors on the blades, and $\Psi$ is the rotor blade azimuth angle.

BRIEF DESCRIPTION OF THE DRAWINGS

The invention will now be described by way of example only and with reference to the accompanying drawings in which.

DESCRIPTION OF THE PREFERRED EMBODIMENTS

Figure 1:
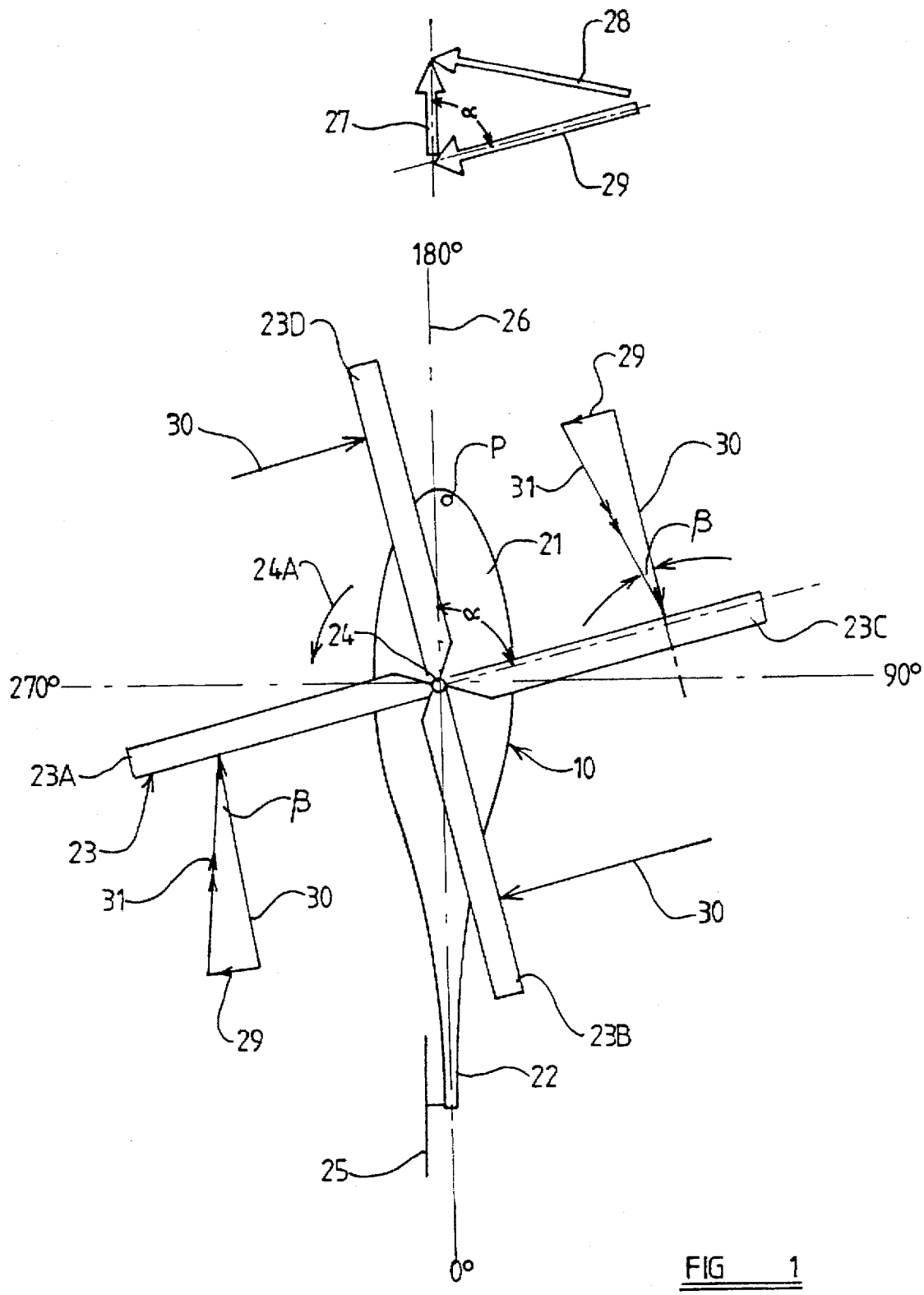
FIG. 1 is a schematic plan view of a helicopter and shows velocity vectors used in the method and apparatus of this invention.

Referring now to FIG. 1 a helicopter to, illustrated schematically in plan, includes a fuselage 21 having a rearwardly extending tail boom 22 located symmetrically about a longitudinal centre line 26. The helicopter has a main sustaining rotor 23 comprising four rotor blades 23A, 23B, 23C and 23D extending radially from a rotor head (not shown) for rotation about a generally vertical axis 24 in a generally horizontal plane in the direction of arrow 24A. An anti-torque rotor 25 is located at the end of the tail boom 22.

The azimuthal position of the rotor blades in the rotational disc are usually identified from 0° relative the longitudinal centreline at the rear of the tail boom 22 in the direction of rotation, and the 0°, 90°, 180° and 270° azimuth positions are identified in FIG. 1. This identification arrangement will be retained throughout this specification.

Normally, with the helicopter flying forward parallel to the longitudinal centreline 26, a rotor blade moving between 0° and 180° azimuth positions is termed the advancing blade and when moving between 180° and 360°, the retreating blade. In this specification however, these terms are applied in respect of rotation of the blades commencing at positions perpendicular to a relative wind vector (as hereinafter described). In contrast, wind azimuth angles are identified as 0° approaching the nose of the helicopter and run clockwise from that position.

The method and apparatus of this invention is based on the realisation by the inventor that, as a helicopter translates in any direction relative to the wind, a cyclic airflow velocity component is generated along the radial dimension, i.e. the span, of the main rotor blades.

The velocity vector diagrams concerned with this invention are illustrated in FIG. 1.

The vector diagram at the top of the Figure is representative of a helicopter velocity 27 illustrated as a forward velocity along the longitudinal centreline 26 and a natural wind direction 28 which is resolved into a relative wind vector 29 as actually felt by the helicopter. The relative wind vector 29 extends at an angle $\alpha$ from the 0° wind azimuth position and, for the purposes of description only, is 75° as shown in FIG. 1.

The vector diagrams shown in connection with rotor blades 23A and 23C are located at a predetermined radial location (as hereinafter discussed) and comprise a rotational velocity vector 30 located perpendicular to a blade feathering axis, and the relative wind vector 29. These vectors resolve into a vector 31 defining with vector 30, a sideslip angle $\beta$. It will be understood that $\beta$ is at a maximum in respect of diametrically opposed blades 23A and 23C which are parallel to the relative wind vector 29 (at blade azimuth positions as hereinbefore defined of 105° and 285°), and that $\beta$ is zero (i.e. there is no sideslip angle) on diametrically opposed blades 23B and 23D where the rotational velocity 30 and relative wind velocity 29 are parallel (at blade azimuth positions of 15° and 195° respectively).

Thus it will be clear that the actual azimuth position of maximum and zero sideslip angles $\beta$ will depend on the direction of the relative wind vector 29, and that they will always be approximately 90° apart in the rotor rotational disc, as determined by equation 1.

Accordingly each of the rotor blades 23A, 23B, 23C and 23D experiences a variation in sideslip angle $\beta$ as the blades rotate around the rotor azimuth, and the inventor has found that the airspeed and the relative wind vector can be obtained from measurements of the airflow sideslip angle $\beta$.

The relationship between the sideslip angle $\beta$ and the relative wind velocity is given by the equation:

$$\beta = \arctan\{V\cos(\Psi+\theta)/(xVT+V\sin(\Psi+\theta))\} \quad (1)$$

where:

V is the velocity of the relative wind, $\theta$ is the relative direction of wind (the wind azimuth), VT is the tip speed of the rotor blades, x is the radial location of sideslip detectors on the blades, and $\Psi$ is the rotor blade azimuth angle.

Figure 2:
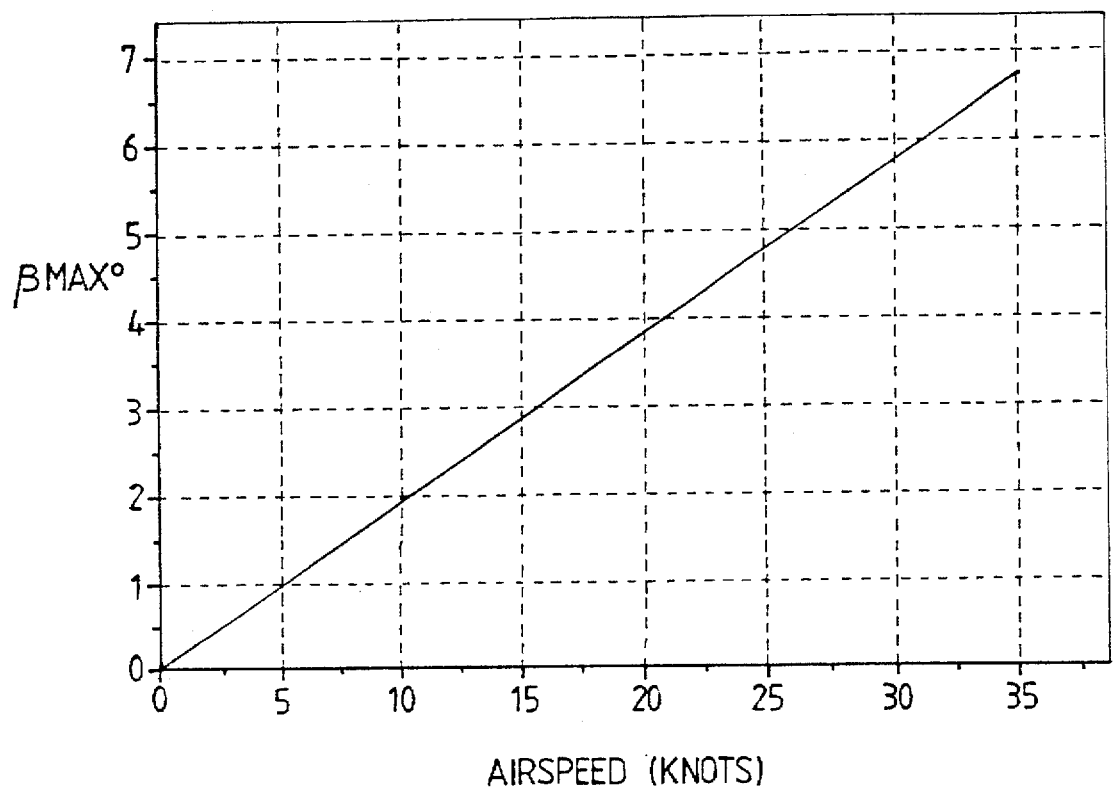
FIG. 2 is a graph illustrating a relationship between a sideslip angle and airspeed, FIG. 3 plots sideslip angle against rotor azimuth for selected airspeeds above 50 knots, FIG. 4 plots sideslip angle against rotor azimuth for selected airspeeds below 50 knots, FIG. 5 plots sideslip angle against rotor azimuth and illustrates a change in phase due to a change in wind azimuth.

FIG. 2 is a graph plotting various maximum sideslip angles ($\beta$MAX) against airspeed (knots) at a low end of the speed range, and clearly shows that the relationship is almost linear. Whilst not shown, this generally linear relationship was found to extend throughout the sideslip angles of interest in a helicopter up to a maximum of about 34 degrees that is representative of an airspeed of about 200 knots.

Figure 3:
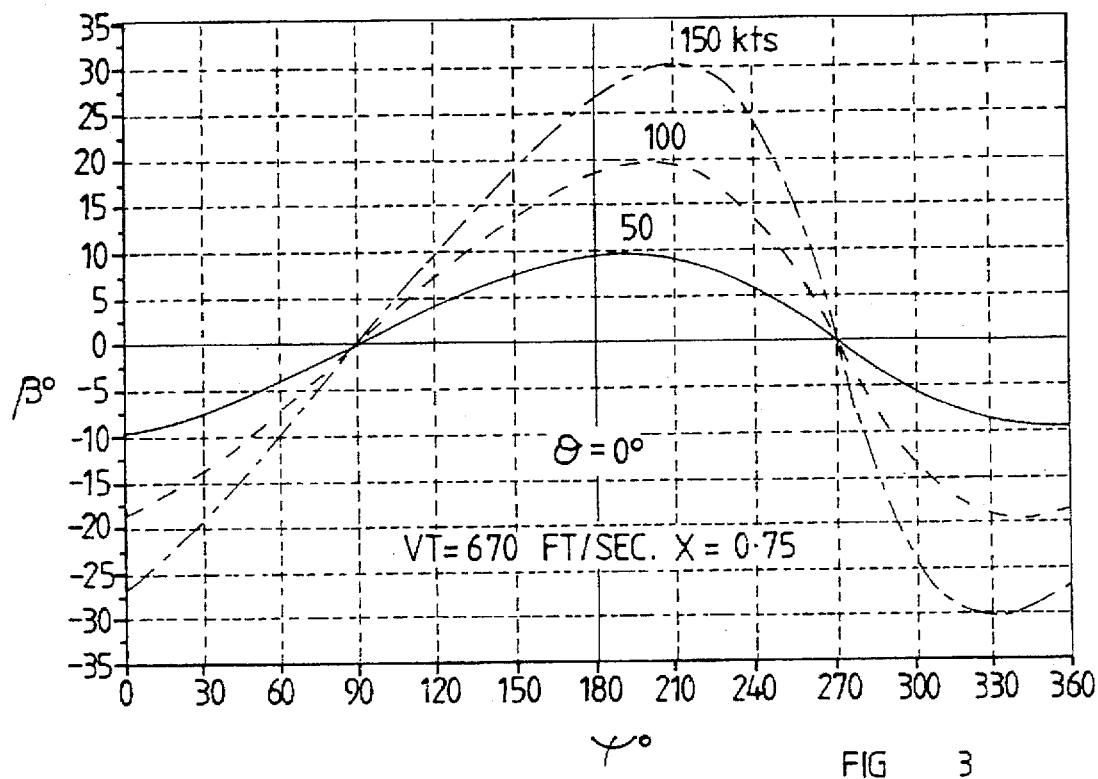

FIG. 3 plots sideslip angle ($\beta$) against rotor azimuth ($\Psi$) with wind azimuth $\theta$=0, rotor blade tip speed VT=670 feet per sec. and sensor location x=0.75, and shows resultant curves in respect of airspeeds of 50, 100 and 150 knots. The graph shows that maximum and minimum sideslip angles (i.e. the sideslip angles of opposite sign) occur approximately midway between the points where the curves cross the axis at zero sideslip angle.

Since equation (1) involves division by a constant plus cyclic term, higher harmonics were found to be present in the sideslip angle $\beta$ and this was particularly evident as airspeeds increased above about 50 knots as shown in FIG. 3. However, as shown in FIG. 4 for the same design parameters the higher harmonics almost disappear and the sideslip angle $\beta$ tends to a simple cosine variation for speeds less than 50 knots.

Figure 4:
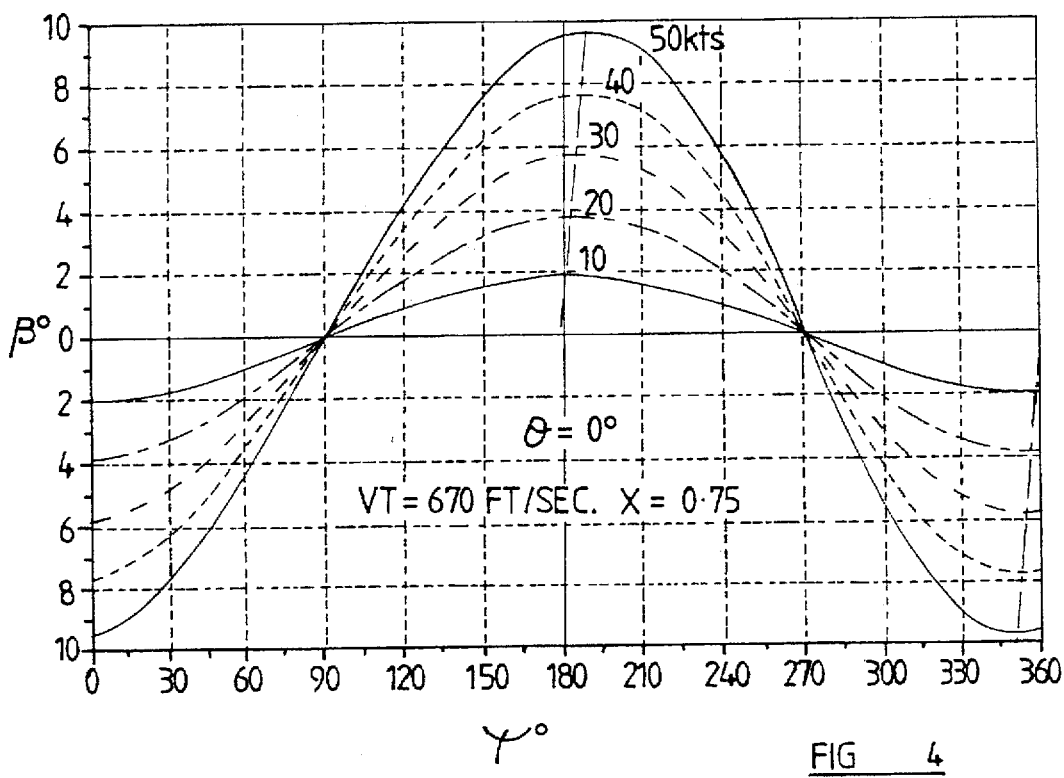

FIG. 4 includes curves representative of airspeeds of 10, 20, 30, 40 and 50 knots and as would be expected with $\theta$ (wind azimuth)=0, the maximum sideslip angles ($\beta$) are achieved at 0 and 180 degrees and zero sideslip angles occur at the cross over points at 90 and 270 degrees azimuth.

Figure 5:
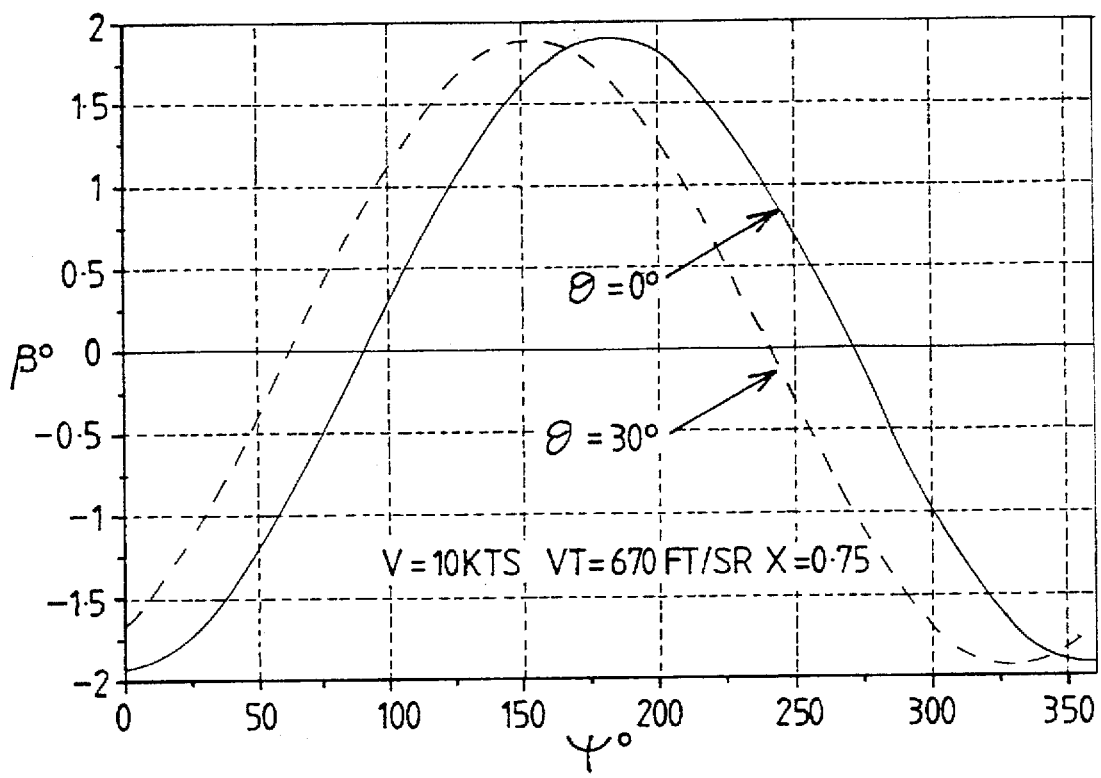

The change in phase of the sideslip angle $\beta$ due to a change in the relative wind azimuth $\theta$ is shown in FIG. 5 for a relative wind velocity V (or airspeed) of 10 knots. The full line is representative of the 10 knot airspeed curve of FIG. 4 on a larger scale and the broken line represents the curve at the same wind velocity but with the relative wind azimuth $\theta$=30 degrees.

As shown, maximum sideslip angles now occur at 150 and 330 degrees rotor azimuth and zero sideslip angles occur at 60 and 240 degrees rotor azimuth. Thus, there is no variation in amplitude in respect of the sideslip angles only a change in phase.

It will be noted that the maximum amplitude of $\beta$ in FIG. 5 is almost 2 degrees which should be easily measurable by appropriate sensors and is much larger than any cyclic lag motion of the rotor blades themselves. It is anticipated that the blade sideslip angle should be able to be resolved to better than 0.5 degrees, in which case the airspeed should be able to be resolved within about 2 knots.

As will now be clear, this invention relies on the measurement of the sideslip angle $\beta$ resulting from radial and tangential flow components effective on a rotating rotor blade, and this means that an appropriate sideslip detector must be positioned on the blade so as to be insensitive to blade angle of attack and away from tip effects. For these reasons it may be preferable that the sensor is located on the lower surface of the rotor blade and in a region between about a 50 percent blade chord and a 95 percent blade chord where the local velocity is relatively insensitive to angle of attack, and the heat transfer coefficient is almost constant.

The radial location of the sideslip sensor will be a compromise between the need to maximise the resultant sideslip angle by mounting the sensor inboard, and the need to minimise higher harmonics and avoid any interference effects of the fuselage by mounting it sufficiently far outboard. The sensor should therefore be located outboard of a 50 percent radial station and preferably at about a 75 percent radial station where the influence of the nose and tail boom should produce only a minimal disturbance to the sideslip angle, and the effect of trailed tip vortices intersecting with the sensing rotor blade will be of a transient nature that can be removed by filtering the signal.

Figure 6:
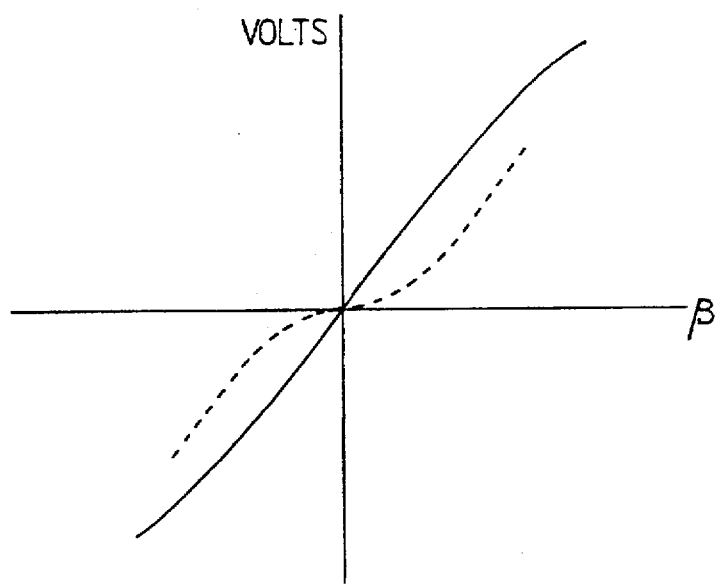
FIG. 6 illustrates desirable characteristics of a sideslip sensor, FIGS. 7 to 10 inclusive illustrate some suitable sensing devices and arrangements.

Any suitable sideslip angle sensor can be used although the design must be such that an electrical output (volts) is generally linearly proportional to the sideslip angle $\beta$ such as shown in the full line in FIG. 6. Some reduction in sensitivity at large sideslip angles may be acceptable and can be calibrated out, however, a loss of sensitivity at small sideslip angles such as indicated by the broken line is unacceptable since it would reduce the accuracy to which the airspeed can be resolved.

Several alternative instrumentation systems are suitable for use in detecting the sideslip angle directly or, alternatively, the radial flow component from which the sideslip angle can be calculated.

Figure 7:
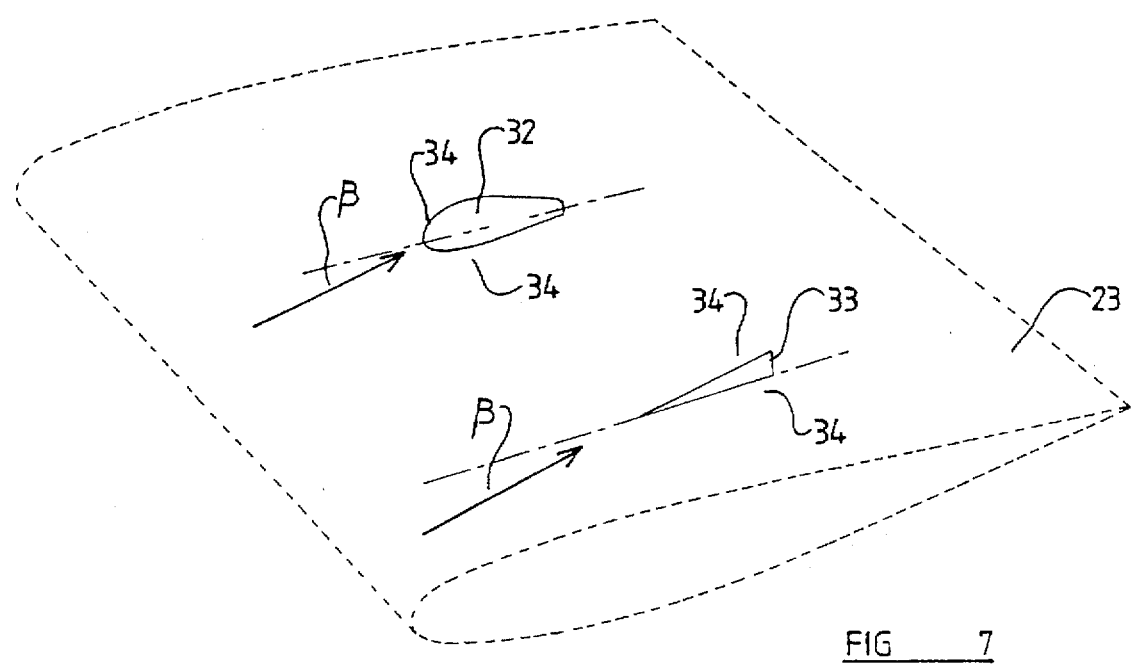

Two embodiments of a pressure sensing yaw meter similar to that commonly used in wind tunnel testing and adapted to the measurement of blade sideslip angle β are illustrated in FIG. 7 in which the illustrated portion of blade 23 is shown inverted. Thus, either a small aerodynamically shaped blister 32 or a tapered vane 33 is attached chordwise to the blade 23 separating pressure ports 34 connected to a differential pressure transducer (not shown) for measuring the differential pressures due to sideslip.

Figure 8:
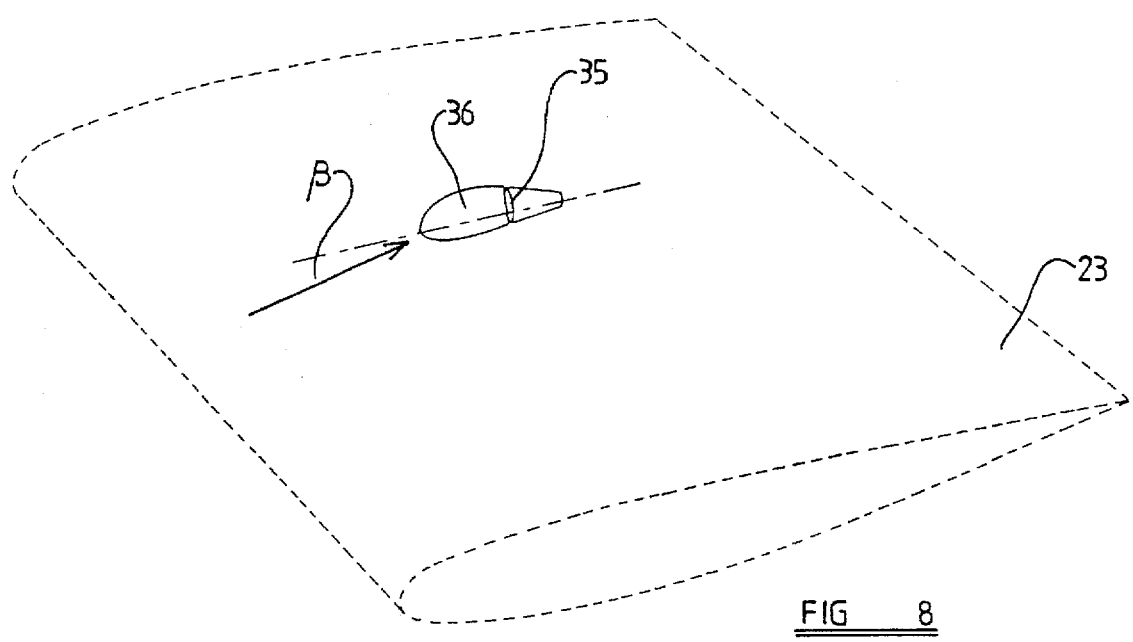

A further alternative system for detecting the sideslip angle which eliminates possible detrimental effects of centrifugal force is illustrated in FIG. 8 and consists of the use of hot film gauges 35 positioned on opposed surfaces of an aerodynamic blister 36 to measure the differential heat transfer created by the airflow about the blister 36 on the surface of blade 23. The gauges may be manufactured integral with the aerodynamic blister 36 and coated with a protective layer to prevent contamination.

In an unillustrated embodiment, temperature sensitive transistors could be used in similar locations to the gauges 35 of FIG. 8, to detect the difference in heat transfer on each side of the aerodynamic blister 36 from which the sideslip angle β can be calculated.

The aerodynamic blister 36 and hot film gauges 35 or temperature sensitive transistors and necessary electrical wiring can be retro-fitted to existing rotor blades or incorporated during manufacture of new blades.

Figure 9:
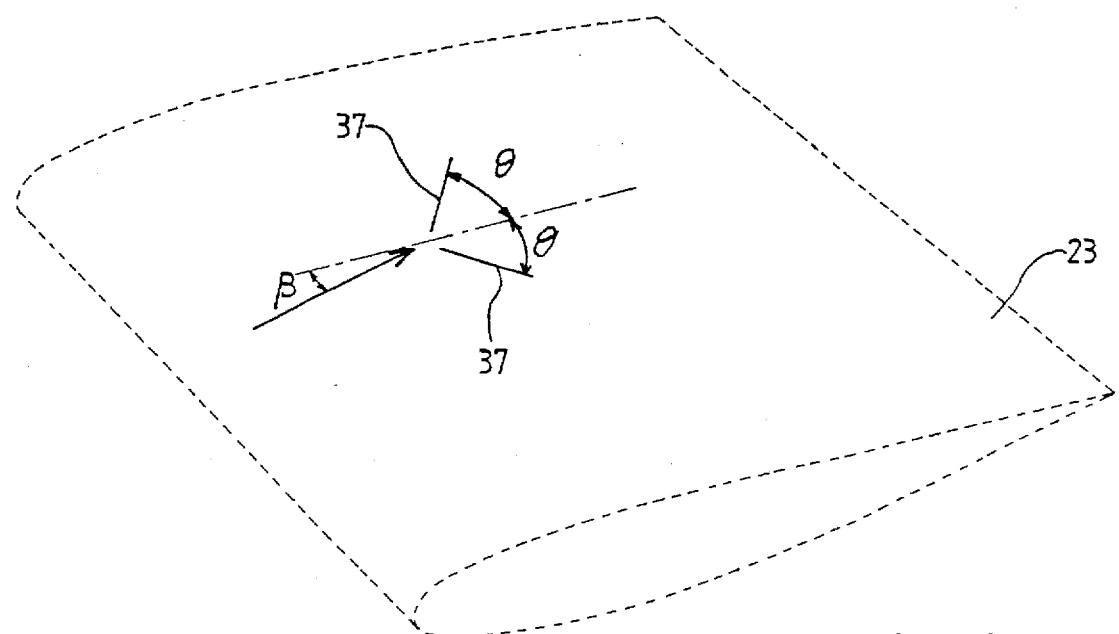

Another type of hot film device capable of measuring both the direction and magnitude of the flow over a surface consists of twin hot film filaments 37 having a length to width ratio of about 100 and mounted in the shape of an inverted 'V' as shown in FIG. 9. Such a gauge detects the flow direction over a smooth surface by measuring differences in the thermal boundary layer, and the heat transfer from the gauges and hence their output follows a cosine relationship to the incident flow (with the cosine raised to a fractional power), from which a differential signal can be obtained.

Such a hot film 'V' gauge is considered particularly well suited for use in this invention since the twin gauges 37 can either be mounted directly on the blade surface, making retro-fit possible, or ultimately formed during the manufacture of the blade. An analysis of the characteristics of such devices suggests that all optimum configuration can be achieved which will both maximise sensitivity in the range of sideslip angles of interest and that the output will be linear within that range.

Figure 10:
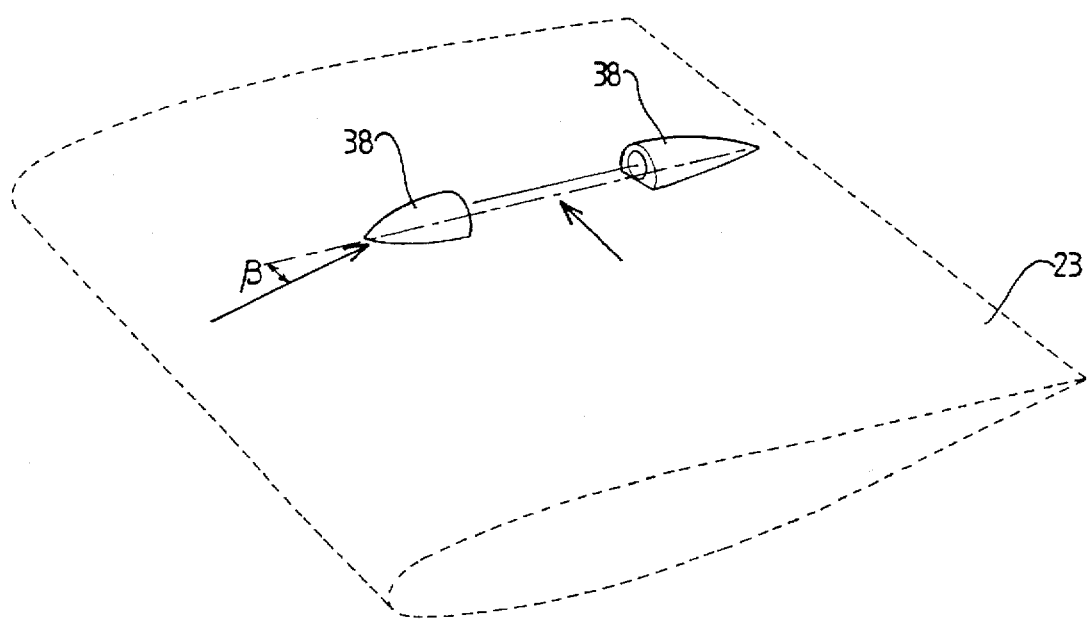

Another method for detecting the radial flow along a rotor blade from which the sideslip angle β can easily be calculated is the use of ultra-sonics. A possible installation is shown in FIG. 10, in which the rotor blade 23 is again shown inverted, as comprising two ultra-sonic transducers 38 (shown exaggerated in size for clarity) spaced-apart chordwise on the lower surface.

This method has the advantage of not being affected by either centrifugal forces or contamination or bridge balancing requirements, and would be very robust. Since the transducers 38 are quite small, the system may be self contained with the radio transmission electronics included in a detector housing.

Another possibility for detecting the direction of the airflow is the use of laser light. Small laser diodes could also be arranged to detect the radial flow velocity.

The electrical signal from the blade sideslip detectors (of whatever form) is transmitted from the rotating blades to a signal processing unit P in the aircraft fuselage. This can be accomplished using slip rings but a system based on non-contact transmission using radio or other means is preferred. The transmission system can be small, lightweight, robust and inexpensive. The necessary electrical wiring can be built into new blades during manufacture, and sensor and transmission electronics could be integrated.

The signal processing unit will contain information in suitable form concerning the relationship between sideslip angle β and airspeed. Signal processing is straightforward since it is only necessary to filter the signal from the sideslip detectors and determine its phase and amplitude. At low speeds (as illustrated in FIG. 3) the signal closely follows a cosine wave with its phase and amplitude related directly to the relative wind direction and airspeed respectively. The phase angle can be established by detecting the zero sideslip angle crossing points in the rotor azimuth so as to minimise the effects of any higher harmonics present at high airspeeds. Since the amplitude and phase of the harmonics depends only upon the advance ratio, the processed signal can be readily calibrated for use also at high forward speeds.

Figure 11:
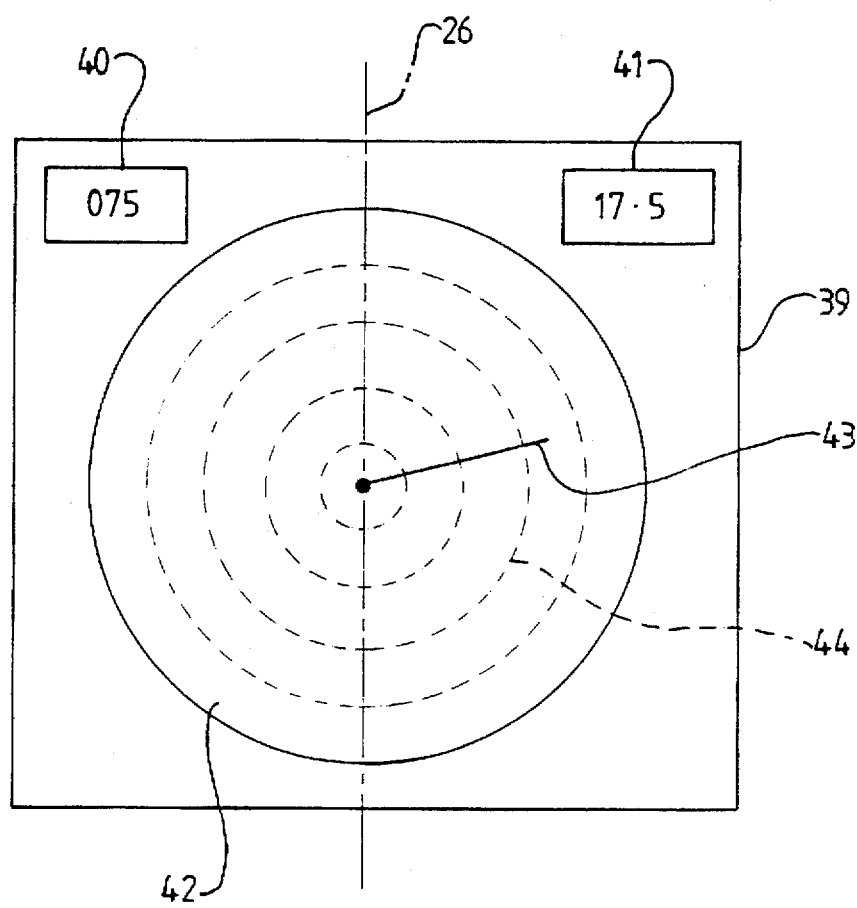
FIG. 11 illustrates an instrument suitable for displaying airspeed and wind direction information.

The resultant processed signals relating to both airspeed and relative wind direction can be incorporated into existing instrumentation in a cockpit for display to a pilot. Alternatively, a dedicated instrument as illustrated in FIG. 11 could be used. The instrument 39 includes digital displays 40 and 41 for displaying the relative wind azimuth and airspeed, and a central circular display screen 42 including a movable bar 43 showing the direction of the relative wind from the longitudinal centreline of the helicopter as represented at 26. The length of the bar 43 varies with airspeed so as to provide, in combination with concentric rings 44 representative of different airspeeds, a visual indication of airspeed to the pilot.

While several embodiments have been described and illustrated it will be understood that many modifications may be made without departing from the scope of the invention. For example, the method and apparatus can be applied to rotary wing aircraft having any number of rotor blades. Any suitable detection means can be used and a plurality of sensors could be used on each blade to extend or optimise the range and sensitivity of the system. In such an arrangement, automatic switching between the plurality of sensors could be incorporated to cater for different phases of operation. In some installations, the or some of, the sensors may be located on an upper surface of the rotor blade.

The invention claimed is:

1. A method of detecting the airspeed of a rotary wing aircraft having a sustaining rotor with a plurality of radially extending rotor blades for rotation about a substantially vertical axis, comprising the steps of measuring on at least one of the rotor blades of the sustaining rotor, an airflow sideslip angle of an airflow over the surface of the rotor blade as the blade rotates, producing a signal representative of said sideslip angle, comparing said signal in processing means containing information on a known relationship between said sideslip angle and airspeed, and providing an output signal representative of the airspeed and wind direction to a display means.

2. A method according to claim 1 wherein the airflow sideslip angle is measured by determining the vector of a radial flow component due to the relative wind vector and the rotational velocity of the rotor in a direction perpendicular to a blade feathering axis.

3. A method according to claim 1 wherein the signal representative of said sideslip angle is transmitted to a remote processing means using signalling means.

4. A method according to claim 1 wherein the output signal displayed indicates both the airspeed and wind direction.

5. An airspeed indicating system for a rotary wing aircraft having a sustaining rotor comprising a plurality of radially extending rotor blades for rotation about a generally vertical axis comprising sensing means on at least one of the rotor blades for sensing an airflow sideslip angle established by interaction between a radial flow caused by a relative wind vector and a rotational velocity perpendicular to a blade feathering axis, and for generating a signal representative of the sideslip angle, transmission means for transmitting the signal to processing means on or in the aircraft fuselage, the processing means containing information on a known relationship between the measured sideslip angle and airspeed for providing an output signal, display means for displaying said output signal.

6. A system according to claim 5 wherein the indicating means is adapted for displaying said airspeed and relative wind direction.

7. A system according to claim 6 which includes means for transmitting by a signalling means the signal from the sensing means to the processing means.

8. A system according to claim 6 wherein the sensing means is located outboard of a 50% radial station.

9. A system according to claim 1 wherein the sensing means is located at about a 75% radial station.

10. A system according to claim 5 wherein the sensing means produces an electrical signal indicative of the sideslip angle.

11. A system according to claim 10 wherein the sensing means comprises a pressure sensing yaw meter.

12. A system according to claim 11 wherein the yaw meter includes a pair of separated pressure ports connected to a differential pressure transducer which measures differential pressures on the rotor blade due to sideslip.

13. A system according to claim 10 wherein the sensing means comprises a pair of hot film gauges mounted to measure the differential heat transfer created by the airflow on the surface of the blade.

14. A system according to claim 10 wherein the sensing means comprises a hot film V gauge which detects the flow direction over the surface of the blade by measuring differences in the thermal boundary layer and the heat transfer from the gauges.

15. A system according to claim 10 wherein the sensing means comprises a pair of ultrasonic transducers spaced apart chordwise on the blade.

16. A system according to claim 10 wherein the sensing means comprises one or more laser diodes arranged to detect radial flow velocity.

17. A system according to claim 10 which incorporates more than one different kind of sensing means to detect the radial flow velocity and to provide a signal to the processing means.

18. A method of detecting the airspeed of a rotary wing aircraft having a sustaining rotor with a plurality of radially extending rotor blades for rotation about a substantially vertical axis, comprising the steps of measuring on at least one of the rotor blades of the sustaining rotor, an airflow sideslip angle of an airflow over the surface of the rotor blade as the blade rotates, producing a signal representative of said sideslip angle, comparing said signal in processing means containing information on a known relationship between said sideslip angle and airspeed, and providing an output signal representative of the airspeed and wind direction to a display means, wherein the airflow sideslip angle $\beta$ is established by the equation:

$$\beta = \arctan\{V\cos(\psi+\theta)/(xVT + V\sin(\psi+\theta))\}$$

where:

V is the velocity of relative wind, $\theta$ is the relative direction of the wind (the wind azimuth), VT is the tip speed of the rotor blades, x is the radial location of the sideslip detectors on the blades, and $\psi$ is the rotor blade azimuth angle.

19. An airspeed indicating system for a rotary wing aircraft having a sustaining rotor comprising a plurality of radially extending rotor blades for rotation about a generally vertical axis comprising sensing means on at least one of the rotor blades for sensing an airflow sideslip angle established by interaction between a radial flow caused by a relative wind vector and a rotational velocity perpendicular to a blade feathering axis, and for generating a signal representative of the sideslip angle, said sensing means located on the lower surface of the rotor blade and in a region between about a 50% blade chord and a 95% blade chord, transmission means for transmitting the signal to processing means on or in the aircraft fuselage, the processing means containing information on a known relationship between the measured sideslip angle and airspeed for providing an output signal, and display means for displaying said output signal.

* * * * *